US008552281B1

(12) United States Patent
Cotrone

(10) Patent No.: US 8,552,281 B1
(45) Date of Patent: Oct. 8, 2013

(54) DIGITAL SHEET MUSIC DISTRIBUTION SYSTEM AND METHOD

(76) Inventor: Carlo M. Cotrone, Milwaukee, WI (US)

(*) Notice: Subject to any disclaimer, the term of this patent is extended or adjusted under 35 U.S.C. 154(b) by 0 days.

(21) Appl. No.: 13/346,501

(22) Filed: Jan. 9, 2012

Related U.S. Application Data

(60) Provisional application No. 61/431,895, filed on Jan. 12, 2011.

(51) Int. Cl.
G09B 15/00 (2006.01)
(52) U.S. Cl.
USPC .......................................... 84/477 R
(58) Field of Classification Search
USPC .......................................... 84/477 R
See application file for complete search history.

(56) References Cited

U.S. PATENT DOCUMENTS

| 6,095,418 | A | 8/2000 | Swartz et al. | |
|---|---|---|---|---|
| 6,423,893 | B1 | 7/2002 | Sung et al. | |
| 7,105,733 | B2 | 9/2006 | Jarrett et al. | |
| 7,183,476 | B2 | 2/2007 | Swingle et al. | |
| 7,209,892 | B1* | 4/2007 | Galuten et al. | 705/26.62 |
| 7,239,320 | B1 | 7/2007 | Hall et al. | |
| 7,371,959 | B2* | 5/2008 | Hiratsuka | 84/645 |
| 7,378,585 | B2 | 5/2008 | McGregor | |
| 7,423,213 | B2 | 9/2008 | Sitrick | |
| 7,518,057 | B2* | 4/2009 | Worrall et al. | 84/722 |
| 7,612,278 | B2* | 11/2009 | Sitrick et al. | 84/609 |
| 7,674,965 | B2 | 3/2010 | Mataele | |
| 7,842,871 | B2* | 11/2010 | Ishii et al. | 84/477 R |
| 7,870,088 | B1* | 1/2011 | Chen et al. | 1/1 |
| 7,935,878 | B2* | 5/2011 | Hiratsuka | 84/600 |
| 8,008,563 | B1* | 8/2011 | Hastings | 84/479 A |
| 8,060,635 | B2* | 11/2011 | Rosenberg et al. | 709/231 |
| 8,090,795 | B2* | 1/2012 | Manwaring et al. | 709/217 |
| 8,273,976 | B1* | 9/2012 | Dalby | 84/602 |
| 8,370,291 | B2* | 2/2013 | Lakamp et al. | 707/602 |
| 2001/0037719 | A1 | 11/2001 | Gardner et al. | |
| 2002/0044158 | A1 | 4/2002 | Peyser et al. | |
| 2004/0159212 | A1* | 8/2004 | Terada | 84/477 R |
| 2006/0117935 | A1* | 6/2006 | Sitrick | 84/477 R |
| 2007/0137463 | A1 | 6/2007 | Lumsden | |
| 2007/0143295 | A1* | 6/2007 | Malik | 707/10 |
| 2007/0220566 | A1* | 9/2007 | Ahmad-Taylor | 725/89 |
| 2007/0221043 | A1* | 9/2007 | Hao | 84/477 R |
| 2007/0295194 | A1 | 12/2007 | Reverdin | |
| 2008/0056491 | A1 | 3/2008 | Craig et al. | |
| 2008/0060500 | A1 | 3/2008 | La et al. | |

(Continued)

OTHER PUBLICATIONS

Arora, N., Beyond Images: Encoding Music for Access and Retrieval, LS598, University of Alabama SLIS, Dr. MacCall, Spring 2010, http://blog.humaneguitarist.org/uploads/MXMListz/Beyond_Images_Encoding_Music_for_Access_and_Retrieval.pdf.

(Continued)

Primary Examiner — David Warren
Assistant Examiner — Robert W Horn

(57) ABSTRACT

A computer-implemented method and system of distributing digital sheet music via a network. In one embodiment, the method comprises offering to a user via a server operated by a distributing party, digital sheet music representative of a song, the digital sheet music being offered with at least one set of predetermined notation data; receiving, from the user over a network, a request for supplemental notation data associated with the song that differs from the at least one set of predetermined notation data; and providing the supplemental notation data to the user.

22 Claims, 7 Drawing Sheets

(56) References Cited

U.S. PATENT DOCUMENTS

| | | | |
|---|---|---|---|
| 2008/0060506 A1 | 3/2008 | Laycock et al. | |
| 2008/0092723 A1 | 4/2008 | Sawyer-Kovelman et al. | |
| 2008/0148067 A1 | 6/2008 | Sitrick et al. | |
| 2008/0196575 A1 | 8/2008 | Good | |
| 2008/0302233 A1* | 12/2008 | Ding et al. | 84/609 |
| 2009/0064847 A1* | 3/2009 | Hao | 84/483.2 |
| 2009/0083386 A1* | 3/2009 | Manwaring et al. | 709/206 |
| 2009/0161917 A1 | 6/2009 | Hori et al. | |
| 2009/0281908 A1 | 11/2009 | Wong | |
| 2010/0024629 A1* | 2/2010 | Hiratsuka | 84/645 |
| 2010/0161499 A1 | 6/2010 | Holcombe et al. | |
| 2010/0218098 A1 | 8/2010 | Sitrick et al. | |
| 2011/0071977 A1* | 3/2011 | Nakajima et al. | 706/54 |
| 2011/0132172 A1* | 6/2011 | Gueneux | 84/454 |
| 2011/0203004 A1* | 8/2011 | Ziering | 726/28 |
| 2011/0203442 A1* | 8/2011 | Raveendran | 84/483.1 |

OTHER PUBLICATIONS

Digital Music Notation Data Model and Prototype Delivery System—A DFG/NEH Bilateral Digital Humanities Program: Bilateral Symposia and Workshops Proposal, 2008, http://music-encoding.org/downloads/MEI-final-proposal-workshop.pdf.

Good, M., Celebrating MusicXML's 10th Anniversary, Oct. 19, 2010, http://michaelgood.info/2010/10/celebrating-musicxml-10th-anniversary.

Good, M., MusicXML in Commercial Applications, 2006, http://michaelgood.info/publications/music/musicxml-in-commercial-applications.

Good, M., Starting MusicXML 3.0, Dec. 20, 2010, http://michaelgood.info/2010/12/starting-musicxml-3-0.

iPad App Showdown: Music Reader vs. ForScore, Apr. 24, 2010, http://techinmusiced.wordpress.com/2010/04/24/quick-ipad-app-showdown-music-reader-vs-forscore.

Kasimi, A., et al., "A Simple Algorithm for Automatic Generation of Polyphonic Piano Fingerings," Proceedings of the 8th International Conference on Music Information Retrieval, 2007, pp. 355-356.

Kasimi, A., et al., Automatic Fingering System (AFS), Queen Mary, University of London, 2005.

Kepper, J., et al., Requirements for a Music-Editorial Data Format, Oct. 2007.

Lick, S.F., Local Company's Computer Kiosk Futurizes Music Sales, Saratoga News, Aug. 7, 1996, http://mytown.mercurynews.com/archives/saratoganews/08.07.96/kiosks.html.

MakeMusic Introduces New SmartMusic Mobile App for Android and Apple, Jul. 21, 2011, http://www.makemusic.com/Pressroom/Default.aspx?pid=515.

MusicaNeo, Introduction, http://www.musicaneo.com/introduction.html, available at least as early as Feb. 19, 2012.

Musicnotes.com Releases Sheet Music App for the iPad, May 18, 2010, http://www.musicnotes.com/press/ipadapp.asp.

MusicWriter, from Wikipedia, the free encyclopedia, http://en.wikipedia.org/wiki/MusicWriter, available at least as early as Jan. 12, 2011.

Recordare LLC, MusicXML 2.0 Tutorial, Aug. 16, 2010.

Sheet Music Plus Announces the Launch of their Digital Print Music Collection, Nov. 28, 2011, http://www.prweb.com/releases/2011/11/prweb8994359.htm.

Terms & Conditions / MXTabs.net, Dec. 10, 2010, http://www.mxtabs.net/content/terms.

Terms & Conditions / Wikifonia, http://www.wikifonia.org/terms, available at least as early as Feb. 19, 2012.

Legato Vault Digital Media Storage and Delivery System, http://musicrain.com/products-vault.php, available at least as early as Feb. 19, 2012.

Legato Sheet Music Viewer, http://musicrain.com/products-sheetmusicviewer.php, available at least as early as Feb. 19, 2012.

* cited by examiner

DIGITAL SHEET MUSIC DISTRIBUTION SYSTEM AND METHOD

RELATED APPLICATION

This application claims the benefit of U.S. Provisional Application No. 61/431,895, filed Jan. 12, 2011, the entire contents of which are incorporated herein by reference.

FIELD

Embodiments of the invention relate generally to the distribution of digital sheet music. More specifically, embodiments of the invention relate to the provision of notation data for digital sheet music.

BACKGROUND

Sheet music may be distributed in hard copy or digital form. Digital sheet music is available for download from various online sources, including websites operated by for-profit and non-profit entities.

SUMMARY

The following summary describes certain exemplary embodiments of the invention. It does not describe all such embodiments and in no way should be construed as limiting of embodiments of the invention.

In one embodiment, the invention provides a computer-implemented method of distributing digital sheet music via a network, comprising: offering to a user via a server operated by a distributing party, digital sheet music representative of a song, the digital sheet music being offered with at least one set of predetermined notation data; receiving, from the user over a network, a request for supplemental notation data associated with the song that differs from the at least one set of predetermined notation data; and providing the supplemental notation data to the user.

In another embodiment, the invention provides a distribution server configured to implement the above-described method.

In another embodiment, the invention provides a computer-readable medium encoded with a plurality of processor-executable instructions for performing the above-described method.

In another embodiment, the invention provides a computer-implemented method of distributing digital sheet music via a network, comprising: offering to a user, by a server operated by a distributing party, digital sheet music representative of a song, the digital sheet music being offered with at least one set of predetermined notation data, wherein the digital sheet music is offered via an ordering interface presented to the user; receiving, by the server from the user over a network via the ordering interface, a request for supplemental notation data associated with the song that differs from the at least one set of predetermined notation data; processing the request for supplemental notation data; and providing, by the server, the supplemental notation data to the user, based on the processing.

In another embodiment, the invention provides a system of distributing digital sheet music via a network, the system comprising a distribution server that includes an ordering interface and a processing module. The ordering interface is configured to offer, to a user, digital sheet music representative of a song, the digital sheet music being offered with at least one set of predetermined notation data. The ordering interface is further configured to receive, from the user over a network, a request for supplemental notation data associated with the song that differs from the at least one set of predetermined notation data. The processing module is configured to process the request for supplemental notation data, and the distribution server is configured to provide the supplemental notation data to the user, based on the processing.

DETAILED DESCRIPTION

Figure 1:
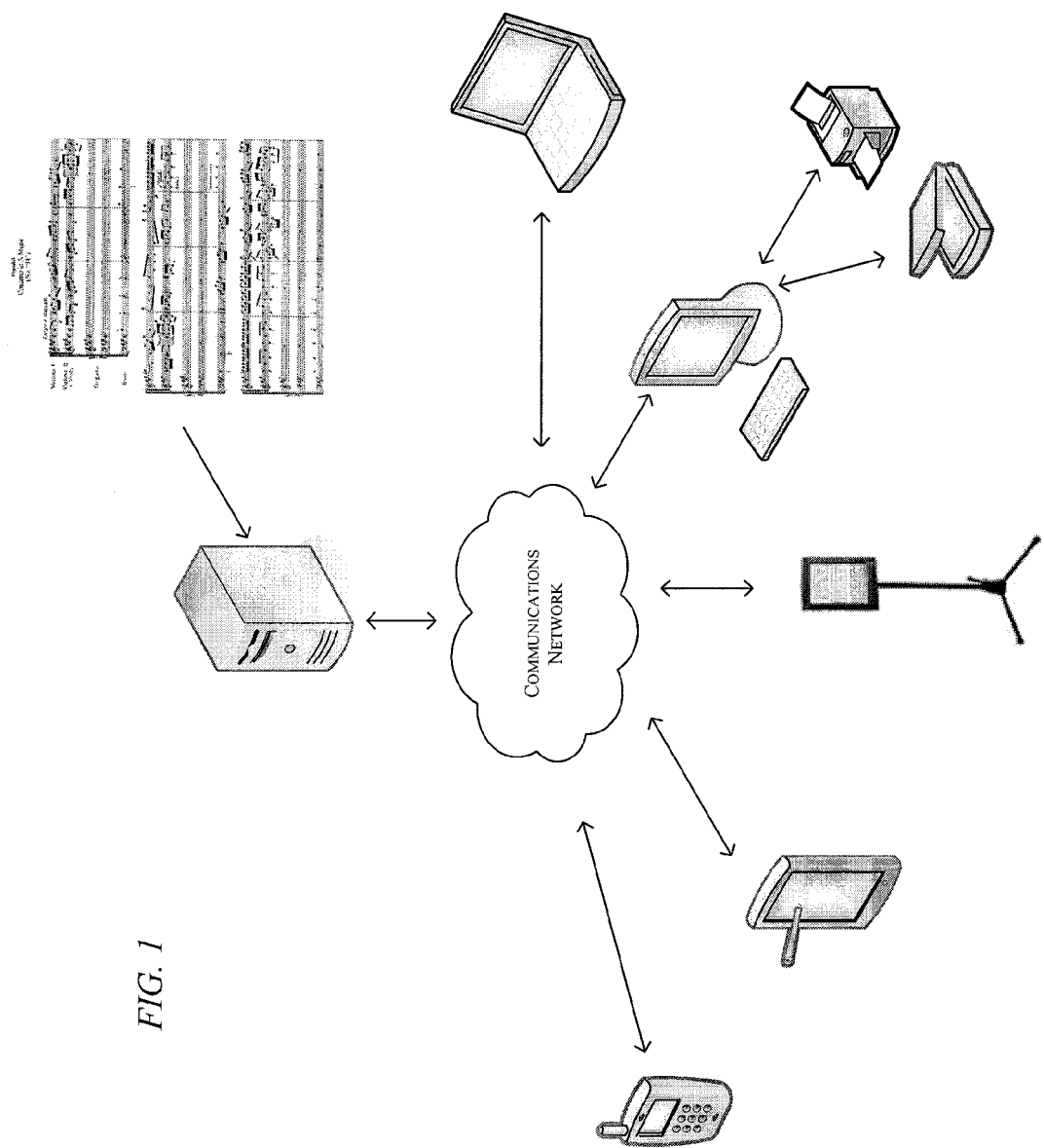
FIG. 1 is a high-level representation of a system for distribution of digital sheet music.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Embodiments of the invention relate to systems, methods, apparatus, and computer-readable media for distributing digital sheet music, such as via a server (e.g., associated with a website). In various embodiments, notation data is selectively made available to a user who wishes to obtain digital sheet music for a song. The notation data can be created automatically, semi-automatically, or manually, and can be created by an operator of the distribution server, a third party organization (e.g., a company who has contracted with the operator to provide notation data), or an individual user. In some embodiments, the notation data is customized for the user prior to or after being provided to the user. In other embodiments, the notation data is provided to the user and changed in some respect by the user, and the changed notation data is provided to the server for archiving and/or distribution to other users. In some embodiments, at least a portion of the notation data provided to the user is different from notation data associated with transposition of the song to another key (e.g., notation data merely representative of a transposed pitch or set of pitches of a song, corresponding transposed key signature information, etc.). For instance, the notation data is supplemental to the existing notation data within the digital sheet music, providing expanded, reduced, or altered sets of information for benefit of the user.

Herein, the term "song" is used as shorthand to encompass a musical work that can be represented as digital sheet music, such as, for example, a musical fragment, phrase, song, piece, composition (e.g., symphony), collection or compilation of multiple pieces (e.g., vocal score), etc.

Notation data includes information useful for a user of digital sheet music, such as, for example, fingering information (e.g., numbers indicative of the particular fingers to be played during performance of a song on a keyboard such as a piano, or guitar fingering notation), pedal markings (e.g., heel and toe markings for organ music), a translation into another language (e.g., English) of text that is part of the sheet music, textual or audible pronunciations of sung or spoken text of a song, additional or alternate verses of a song, tempo or dynamic markings, articulation marks, ornaments, retakes, chord symbols, figured bass notation, organ registrations, editorial commentary (user comments, symbols, etc.), tablature symbols, notes, alternate pitches, alternate or corresponding parts, descants, text (e.g., a song's title, composer, or arranger), page turn information (e.g., an indication that a musician or software should proceed to a given page, measure, etc.), version information, version comparison information, measure numbers, solfège syllables, Suzuki method notation, other alphanumeric, symbolic, audio, visual, and/or audiovisual content, etc. The notation data can relate to one or more individual song elements, notes, beats, or phrases, or can relate to the song as a whole.

Embodiments of the invention provide information to musicians, musicologists, music students, and educators that enhances the study and performance of music. Additionally, embodiments enable the acquisition, storage, distribution, and modification of such information.

FIG. 1 is a high-level representation of a system for distribution of digital sheet music. Digital sheet music is stored on a server or in a data source accessible to the server. Via one or more networks and/or connections (e.g., the Internet, wide area network(s)—WANs, local area network(s)—LANs, personal area network(s)—PANs), digital sheet music for a song is provided to a personal computer (e.g., desktop or laptop), a smartphone, a tablet computer (e.g., iPad), a digital music stand, or the like for use by a user, such as for printing of the music on a printer, subsequent scanning of the music via a scanner, electronic playing of the music using an application program (e.g., a player), or reading of the music on a device screen for purposes of interpretation, composing or arranging, study, rehearsal, or performance. The digital sheet music may be offered for purchase by a website that offers certain sheet music titles in multiple keys. Before purchasing a song of interest, the user selects a desired key from among the available options, and the digital sheet music is provided to the user in that key. The digital sheet music may include a header, footer, legend, or other indication that includes the user's name and states that the user is authorized to use the provided digital sheet music.

Figure 2A:
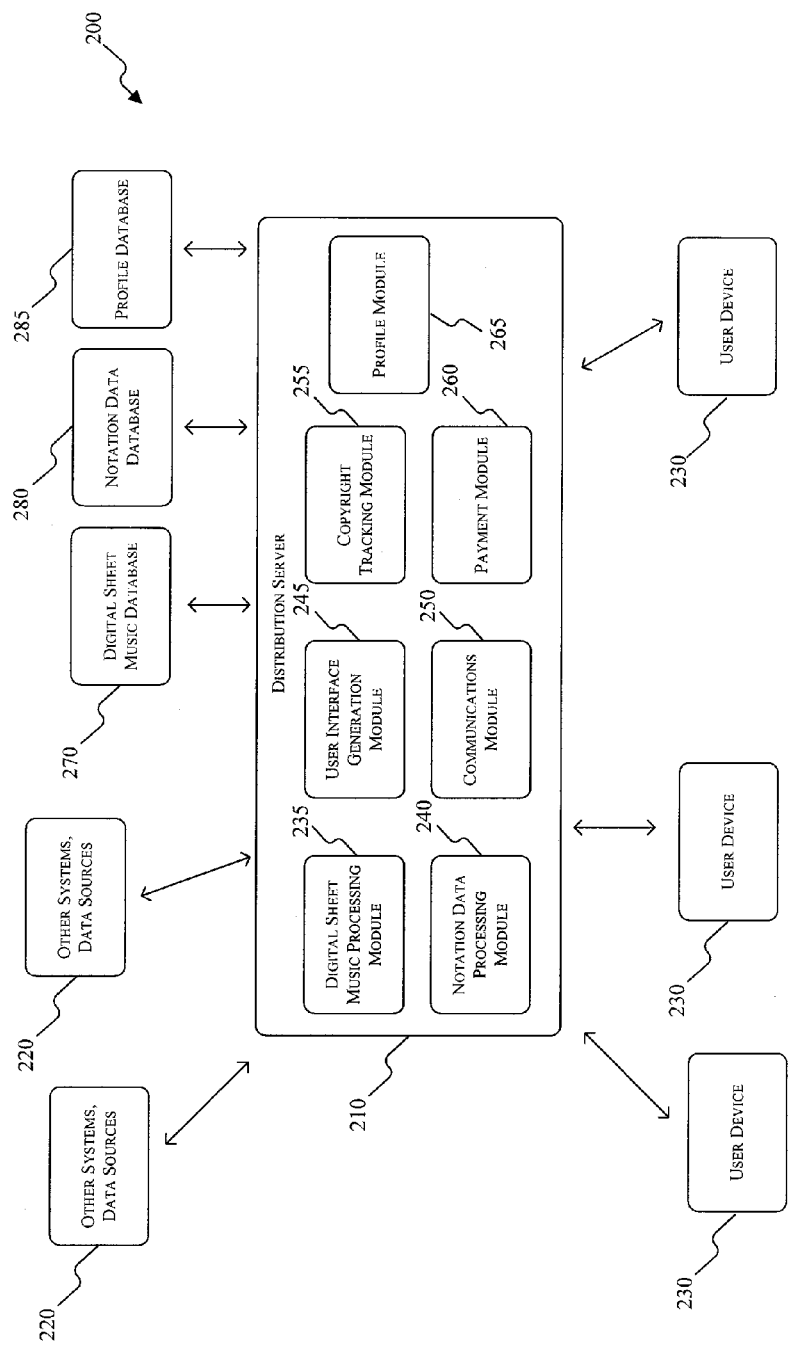
FIG. 2A illustrates a system for distribution of digital sheet music according to an embodiment of the invention.

FIG. 2A illustrates a system 200 for distribution of digital sheet music according to an embodiment of the invention. The system 200 is generally implemented with various client and server components, such as in an electronic commerce framework (e.g., a cloud computing framework, Software as a Service [SaaS], etc.). In particular, the system 200 includes a distribution server 210, a digital sheet music database 270, a notation data database 280, a profile database 285, a plurality of other systems and data sources 220 (e.g., remote databases and application servers accessible by, or in communication with, the distribution server 210), and a plurality of user devices 230 (e.g., user devices such as listed above in connection with FIG. 1). The distribution server 210, databases 270, 280, 285, systems and data sources 220, and user devices 230 communicate over any suitable communication means, such as wired and/or wireless network connections spanning networks such as those listed above.

In some embodiments, the distribution server 210 distributes copyrighted digital sheet music, public domain digital sheet music, or a combination thereof, and may be operated by a for-profit entity, such as a publisher, or a non-profit entity, such as a conservatory of music or other organization that maintains an archive of digital sheet music. In some embodiments, users pay for access to distributed digital sheet music (e.g., on a per-song basis, subscription basis, etc.) in the catalog of the distribution server 210. In other embodiments, user access is substantially free, with advertising, contributed, and/or other monies being used to support operation of the system 200. In some embodiments, the operator of the distribution server 210 owns the copyright or substantially the entire copyright in a work to be distributed as digital sheet music, owns a portion of the copyright, or is licensed by the copyright owner to distribute the work as digital sheet music.

The distribution server 210 includes a digital sheet music processing module 235, a notation data processing module 240, a user interface generation module 245, a communications module 250, a copyright tracking module 255, a payment module 260, and a profile module 265. In some embodiments, various modules of the distribution server 210 are implemented as a single module, or certain modules are external to the distribution server 210. For instance, the digital sheet music processing module 235 and the notation data processing module 240 can be implemented as a single module.

The digital sheet music processing module 235 creates, analyzes, prepares, converts, packages, encrypts, decrypts, encodes, decodes, modifies, or otherwise processes digital sheet music received by, stored by, and/or offered in the system 200. Digital sheet music can be represented in any suitable standard, non-standard, proprietary, or other format, such as, for example, MusicXML, NIFF (Notation Interchange File Format), SMDL (Standard Music Description Language), PDF (Portable Document Format), Sibelius, Finale, SCORE, TIFF, and/or variations thereof.

The notation data processing module 240 creates, analyzes, prepares, converts, packages, encrypts, decrypts, encodes, decodes, modifies, or otherwise processes notation data received by, stored by, and/or offered in the system 200. The notation data can be stored as part of the digital sheet music with which it is associated, and/or separately (e.g., in an encrypted or unencrypted standard or proprietary format, in which one or more separate files at least in part contain notation data). In some embodiments, where the notation data is stored separately, the digital sheet music processing module 235 or other module combines the digital sheet music with associated notation data such that both can be presented to a user in a unified form. In other embodiments, an application program on a user device combines the digital sheet music and associated notation data (e.g., at runtime) for presentation to a user. Separately storing the notation data may be employed, for example, to facilitate modification or customization of a default version of digital sheet music for multiple users; or to manage, monitor, or control any copyrights or other licensed or licensable rights associated with the notation data apart from the digital sheet music itself. Alternatively, such objectives may be achieved, for example, by embedding or encoding the notation data in the digital sheet music along with appropriate metadata that can be interpreted by the digital sheet music processing module 235, or other modules or application programs.

Figure 2B:
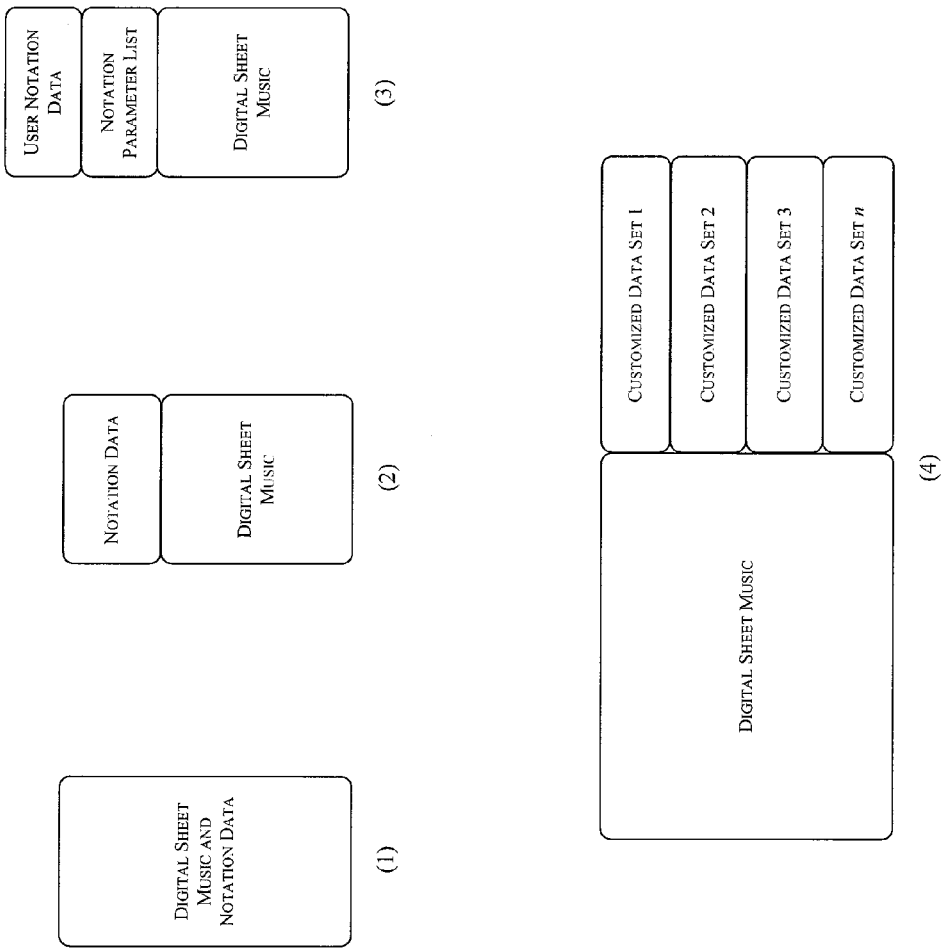
FIG. 2B illustrates exemplary formats for storing supplemental notation data according to embodiments of the invention.

FIG. 2B illustrates exemplary formats for storing supplemental notation data according to embodiments of the invention. The formats can span one file or multiple files and/or memory locations (e.g., multiple co-located or distributed data repositories). In format 2B(1), notation data is embedded within the digital sheet music with which it is associated. For instance, a file in MusicXML or PDF format may include digital sheet music and supplemental notation data, without any mechanism therein that keeps the respective data separate; as such, without reference to external data (e.g., a reference file that only includes the digital sheet music), the supplemental data is not selectively retrievable or identifiable. In format 2B(2), supplemental notation data is stored separately or distinctly from the digital sheet music. For instance, the notation data is stored in a header portion of a digital sheet music file, such that the header serves as a payload for supplemental notation data for one or more users, and the remaining portion of the file includes a base version of digital sheet music. In format 2B(3), a base version of digital sheet music, a notation parameter list, and user notation data are stored separately or distinctly (e.g., in separate portions of a file or in multiple files). The parameter list indicates one or more notation parameters that are customizable for the digital sheet music, and the user notation data includes parameter values or elements for a particular user (e.g., supplemental notation data), which values or elements correspond to parameters among the parameter list. In format 2B(4), a base version of digital sheet music is stored, with an arbitrary number of customized data sets being stored separately or distinctly. The data sets include supplemental notation data that is specific to one user, multiple users, groups of users, etc.

Security measures may be employed to control access to digital sheet music and/or associated supplemental notation data. In one embodiment, the digital sheet music data in any of the various formats of FIG. 2B is locked such that a user cannot extract the individual notation elements, cannot print the digital sheet music, cannot modify the digital sheet music, cannot send the digital sheet music to, or share the digital sheet music with, others (e.g., an unauthorized user), and/or take other actions. In contrast, the supplemental notation data may be edited, printed, and/or shared. In one implementation of format 2B(4), one customized data set may be viewable by or otherwise accessible to one or more individual users (e.g., a user who has a key or other credential necessary for viewing or access), but not with respect to other users. Similarly, another customized data set may be viewable by or otherwise accessible to different individual user(s), but not by others. In some embodiments, modules of the distribution server 210 or library server 710 (e.g., the modules 235, 245, or 760) manage access controls for digital sheet music and/or notation data and selectively modify such controls depending on changes in status (e.g., copyright status, the generation of new or altered notation data, the addition or deletion of authorized users, etc.).

The user interface generation module 245 provides a user interface (e.g., a graphical user interface, GUI, viewable on a web browser or a mobile device) to provide outputs to, and receive inputs from, user devices. In some embodiments, a user can interact with the distribution server 210 via a web browser. Additionally or alternatively, a user can interact with the distribution server 210 via an application program, such as, for example, an app for a mobile user device. An ordering interface may be presented to a user to offer the user digital sheet music and/or notation data, receive requests from the user, and provide digital sheet music and/or notation data to the user. The system 200 may include an order fulfillment module (not shown) that fulfills orders from the user and operates in conjunction with the payment module 260 when appropriate. Digital sheet music and/or notation data may be viewable via the user interface generation module 245 or via other software programs.

The communications module 250 manages communications between the distribution server 210 and the various systems, data sources, devices, networks, and modules in the system 200.

The digital sheet music database 270 and/or notation data database 280 store digital sheet music, notation data for digital sheet music, or both. The databases 270, 280 may be local or remote relative to the distribution server 210, may be combined into a single database, and may be operated by a third party in some implementations. In some embodiments, one or both of the databases 270, 280 store bibliographic information associated with a song and/or its notation data (e.g., title, author/composer, date(s) of copyright, renewal date(s)), royalty payment contact information, status information (e.g., copyright valid, copyright valid until, in public domain, not eligible for copyright protection per se, copyright protection questionable, etc.). The copyright tracking module 255 monitors, updates, and otherwise maintains such information. For instance, the copyright tracking module 255 accesses external databases (e.g., ASCAP's ACE database, BMI's repertoire database, the SESAC repertory database), and/or receives information via the user interface generation module 245, to update, verify, populate, and/or otherwise maintain information in the digital sheet music database 270 and/or notation data database 280. In some embodiments, each version, variation, or other instance of digital sheet music and/or notation data has an associated identifier (e.g., a unique file name, version number, etc.), such that the distribution server 210 can manage a large digital sheet music library that may change over time and that may be utilized by numerous users.

The payment module 260 manages payments, credits, and other financial aspects related to services provided by the distribution server 210. For instance, the payment module 260 determines monies owed by a user for purchase of digital sheet music or notation data, subscription fees, credits owed to a user, royalties or other payments owed to entities (e.g., individuals, corporate entities, organizations), and the like. The payment module initiates or receives payments automatically or semi-automatically using third party payment providers and/or other resources internal or external to the distribution server 210.

The profile database 285 stores information regarding users of the system 200, such as, for example, usernames, passwords, billing information, user skill level, sheet music categories of interest (e.g., by instrument, voice, voicing, accompaniment, digital, print, music genre, etc.), biometric information (e.g., hand span, length of fingers), preferences for the provision of notation data (e.g., always provide, never provide, provide upon request, include ornamentation fingering indications, translated text, and/or hyperlinks, etc.), a history or log detailing a user's previous purchases of digital sheet music and/or notation data, a history or log detailing digital sheet music and/or notation data which the user is authorized to access or receive, etc. The profile module 265 monitors, updates, and otherwise maintains such information, which can be used by various modules of the distribution server 210. For example, the digital sheet music processing module 235 and the notation data processing module 240 use information stored in the profile database 285 to generate appropriate music notation data for a user that is customized to the user. According to various embodiments of the invention, a first user can request, obtain, and/or store notation data that is customized for the first user, while a second user can request, obtain, and/or store notation data that is customized for the second user and may be different from the first user's notation data (e.g., because of differences in the respective users' inputs and/or information stored in the profile database 265).

FIGS. 3-6 are flow diagrams illustrating various processes according to embodiments of the invention. For instance, the illustrated processes may be implemented by the distribution server 210 or library server 710. While the illustrated processes in this application include a number of operations that appear to occur in a specific order, the processes can include more or fewer operations, which can be executed serially or in parallel (e.g., using parallel processors or a multi-threading environment); an order of two or more operations may be changed; two or more operations may be combined into a single operation; and/or one or more operations may be omitted. Additionally, the illustrated processes are described substantially from the perspective of a distribution server, library server, or other remote or local e-commerce application. It is to be appreciated that the illustrated embodiments have counterpart processes from the perspective of other devices or systems (e.g., user devices, servers, or databases).

Figure 3:
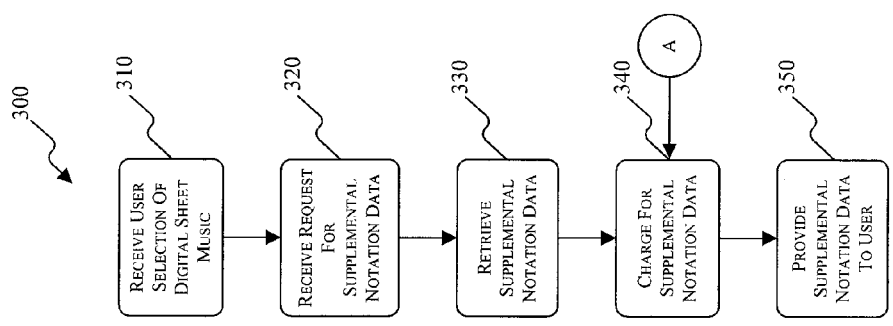
FIG. 3 is a flow diagram illustrating a process of distributing digital sheet music according to an embodiment of the invention.

FIG. 3 is a flow diagram illustrating a process 300 of distributing digital sheet music according to an embodiment of the invention. A user selection of desired digital sheet music corresponding to a song in a catalog is received (step 310). The user selection may include a user selection from among a plurality of versions of the song (e.g., versions of the song in desired keys). A request for supplemental notation data to be associated with the selected version of the song is received (step 320). The requested supplemental notation data is retrieved (step 330), the user is charged for the supplemental notation data (step 340), and the supplemental notation data is provided to the user (step 350), for example, via an application program configured to allow printing of the notation data, via e-mail, via a web link to download a file, etc. Additionally or alternatively, the notation data may be added to and/or stored in the user's library of digital sheet music and/or notation data. In some embodiments, the supplemental notation data is provided separately from the digital sheet music, and the digital sheet music optionally is provided to the user. In some embodiments, a multi-tier pricing structure is instituted by the system 200. For instance, users are charged a first price for a default or standard version of digital sheet music offered by the system 200, and a second, higher price for digital sheet music that includes supplemental notation data. Additionally or alternatively, users pay a charge specifically for supplemental notation data and need not purchase the underlying digital sheet music (e.g., the digital sheet music is in the public domain).

Figure 4:
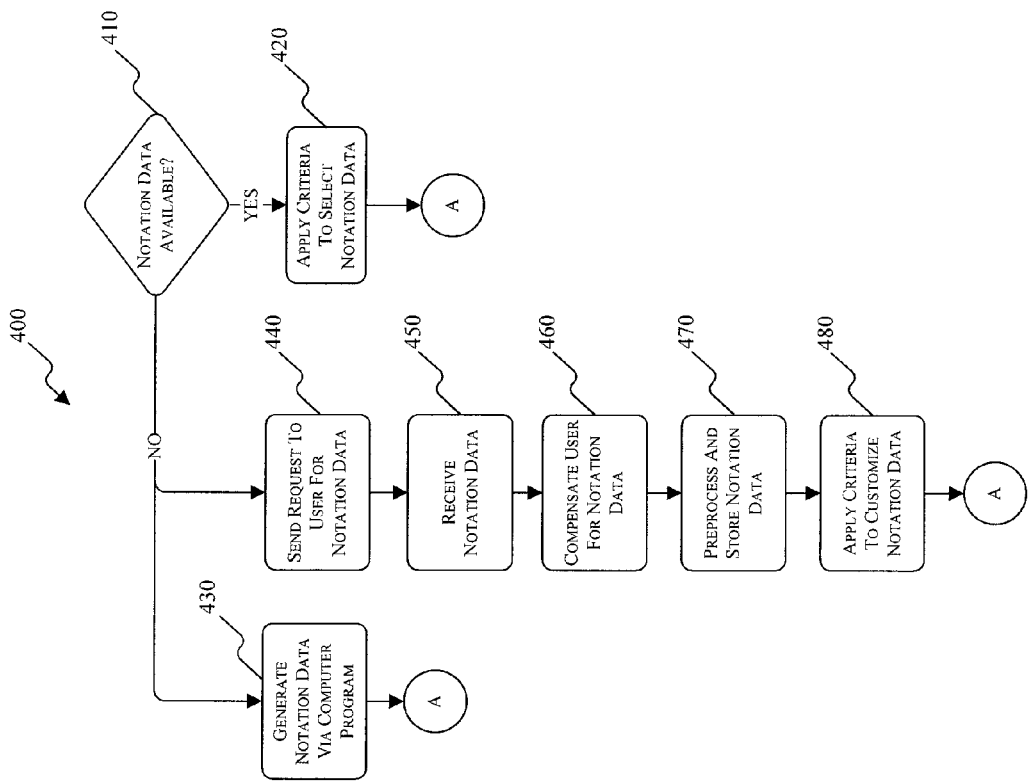
FIG. 4 is a flow diagram illustrating a process of obtaining supplemental notation data according to an embodiment of the invention.

FIG. 4 is a flow diagram illustrating a process 400 of obtaining supplemental notation data according to an embodiment of the invention. The process 400 is an exemplary implementation of step 330 of FIG. 3 above. Based on the request for supplemental notation data (step 320), it is determined whether notation data responsive to the request is available to the system (step 410). If so, criteria is optionally applied to the available notation data as a filter to select an appropriate set of notation data (step 420), and the process returns to step 340 of FIG. 3. If notation data is not available, the process 400 satisfies the user request automatically, semi-automatically, or manually. For instance, notation data is generated via a computer program (i.e., software) that analyzes the applicable digital sheet music (step 430), and the process returns to step 340 of FIG. 3. In one embodiment, if the requested notation data includes fingering indications, the computer program analyzes the sheet music in conjunction with biometric information of the user or other preferences, criteria, and/or parameters to determine appropriate fingering indications to include among the notation data that is to be supplied to the user. Alternatively, notation data is provided via a second user (e.g., a musician, editor, or other person employed by, in contract with, or not previously affiliated with, the operator of the distribution server 210). A request is sent to the second user indicating a need for notation data to be created for the song (step 440). The request may be posted electronically (e.g., in an electronic bulletin board, Facebook musicians users group, etc.). The second user creates the notation data (e.g., manually, semi-automatically using computer and/or other electronic tools), and the notation data is received (step 450). The second user optionally is compensated for the notation data (step 460). The received notation data is preprocessed as appropriate and stored (step 470). Criteria such as that listed above is optionally applied to the notation data to customize the notation data for the user (step 480), and the process returns to step 340 of FIG. 3.

Figure 5:
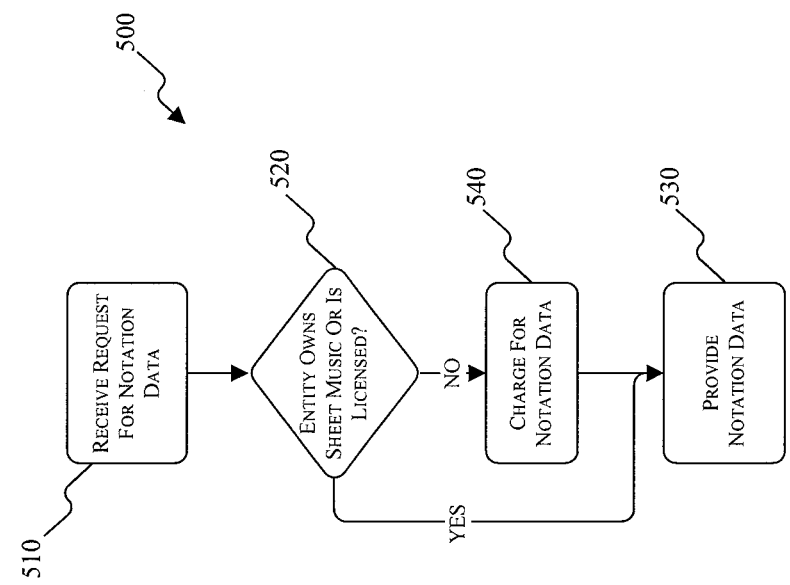
FIG. 5 is a flow diagram illustrating a process of distributing notation data according to an embodiment of the invention.

FIG. 5 is a flow diagram illustrating a process 500 of distributing notation data (e.g., supplemental notation data) according to an embodiment of the invention. A request for notation data for a song is received from a requesting device (step 510). It is determined whether an entity associated with the requesting device (e.g., an individual, corporate entity, organization) currently owns print sheet music for the song, previously purchased print sheet music or digital sheet music for the song, or holds a license to sheet music for the song (step 520). If the determination is positive, notation data is provided to the requesting device (step 530). The notation data may be stored remotely or locally on a user's device. If the determination is negative, the user is charged for the requested notation data (step 540), and the requested notation data is provided to the requesting device (step 530).

Figure 6:
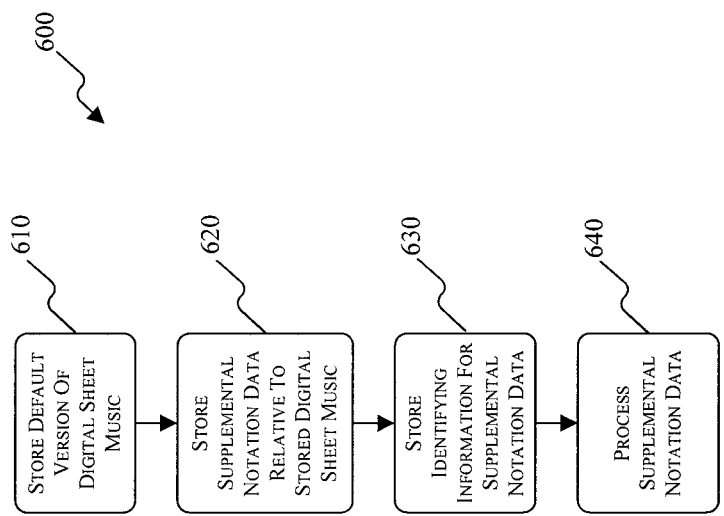
FIG. 6 is a flow diagram illustrating a process of storing digital sheet music according to an embodiment of the invention.

FIG. 6 is a flow diagram illustrating a process 600 of storing digital sheet music according to an embodiment of the invention. A default version of digital sheet music is stored (step 610). Supplemental notation data is stored relative to the stored digital sheet music, such that the supplemental notation data is usable with the default version of digital sheet music (e.g., to supplement or modify existing notation data therein) (step 620). Identifying information for the supplemental notation data is stored (step 630) so that the supplemental notation data can be distributed, modified, analyzed, inserted into digital sheet music, or otherwise processed (step 640). In some embodiments, notation data offered by the distribution server 210 to users and/or notation data received by the distribution server 210 from users has associated identifying information, such as a barcode, signature, key, tag, and/or other indicia (e.g., representative of the user and/or biometric characteristics of the user, user preferences, etc.). Such identifying information can be associated with the notation data separately or with digital sheet music in which the notation data is embedded. Accordingly, notation data can be monitored, tracked, cataloged, analyzed, updated, modified, or otherwise processed as appropriate, for example, to compensate a user who uploaded the notation data, or to offer the notation data to similarly-situated users (e.g., users with similar biometric characteristics, preferences, etc.).

In some embodiments, the distribution server 210 stores notation data associated with users, such as, for instance, in conjunction with maintaining an online digital sheet music library for a user. The stored notation data can be retrieved by its associated user from an archive, modified in some manner, and re-stored in the archive.

In an exemplary embodiment, a user obtains digital sheet music from a distribution server that may or may not contain supplemental notation data. The user modifies the digital sheet music (e.g., by writing annotations on a hard copy of the digital sheet music or inputting annotations electronically, such as via a touch screen). The user then uploads the modified digital sheet music to the system for processing, storage, distribution to other users, and the like.

Notation data provided by embodiments of the invention can be generated subsequent to, at the time of, or prior to a user's request for such notation data, interactively and/or iteratively based on user inputs, settings, or interactions with modules, systems, or data sources internal or external to a distribution system, etc., and can be provided substantially immediately (e.g., on demand or in real time) to the user or a predetermined period of time after a user's request is received (e.g., depending on the time needed to generate notation data automatically, semi-automatically, or manually). In one embodiment, the system automatically notifies a user who has purchased digital sheet music of the availability of new notation data for the purchased digital sheet music at a point in the future and offers the user the notation data for possible purchase and download. In another embodiment, the system optionally automatically notifies the user that previously-purchased digital sheet music has been replaced by a corrected or updated version thereof (e.g., that corrects or updates an aspect of the past-purchased version, such as an error in the notation data thereof) and offers the user the corrected version at no charge. In some embodiments, a new version made available to the user includes version comparison information that highlights or otherwise indicates changes relative to the earlier version or another version (e.g., boxes or brackets around new notation data, strikethrough indications through previous notation data, asterisks with footnotes describing changes, etc.). The version comparison information may be selectively shown (e.g., based on a user selection, based on whether the user had accessed the earlier version, etc.), shown when a user first accesses the new version, etc. The version comparison information may be displayed on pages of digital sheet music and/or provided in related communications (e.g., via text message, e-mail, user webpage, etc.).

In some embodiments, supplemental notation data may be represented differently from predetermined music notation data in digital sheet music. For instance, the supplemental notation data may be presented in a particular color and/or font, highlighted, etc. so that a user can distinguish the supplemental notation data from the predetermined notation data. In some embodiments, the different representation may be selectively visible to the user (e.g., able to be toggled on and off or otherwise configured via user input). In other embodiments, supplemental notation data associated with a first individual may be tracked and represented in a different manner from supplemental notation data associated with a second individual. For example, supplemental notation data created by an agent of the distribution server 210 may be represented in a first color, supplemental notation data uploaded by a first user (e.g., a music teacher or professor) may be represented in a second color, and supplemental notation data uploaded by a second user (e.g., a student or pupil) may be represented in a third color. The respective supplemental notation data sets may be selectively displayed (e.g., simultaneously, alternately, etc.) In one embodiment, supplemental notation data for respective users may be assigned a relative priority. Accordingly, if supplemental notation data for a first and second user exists (e.g., both users have recommended a fingering indication for a specific note of a song), the notation data for the user with higher priority only may be displayed (e.g., only the fingering indication for the higher priority user will be displayed).

According to some embodiments of the invention, the distribution server 210 charges a user a base price for a default or standard version of digital sheet music, which version may contain a set of predetermined music notation data. For instance, for the base price, the user can choose from among versions of a song in different keys. The distribution server 210 charges the user an additional fee for supplemental notation data requested by the user, which may be folded into a total price charged for digital sheet music that includes requested supplemental notation data. For works that are in the public domain (e.g., an applicable copyright has expired or the work has been dedicated to the public), a relatively large percentage of the total price charged by the distribution server 210 may be associated with provided supplemental notation data. Additionally or alternatively, a user may pay a subscription fee (e.g., a monthly or annual fee) that entitles the user to supplemental notation data for multiple songs.

In some embodiments, multiple sets of independent or overlapping notation data are available to a user. For example, an "intermediate" level set or "advanced" level set may include fewer fingering indications than a "beginner" level set. For vocal or choral works in German, an "English" or "Spanish" set with respective translations of the German text may be offered.

Pricing for notation data may differ depending on the complexity involved in preparing the notation data. Notation data for music of moderate difficulty may be priced inexpensively relative to notation data for music of extreme difficulty. For masterworks (e.g., by Chopin or Bach) in which fingering indications throughout a score may be critical to successful study and performance, the price may be substantially higher. In some embodiments, the charge for notation data is waived, such as for users whose volume of purchases via the distribution server over a specified period exceeds a threshold amount, or based on an input coupon or sale code.

According to one embodiment of the invention, notation data of a song includes hyperlinks to documents, websites, or other repositories with information relevant to the song. For instance, one or more hyperlinks link the user to partial or complete translations of song text, music analyses or commentaries (e.g., composer, form and analysis, historical/contextual, etc.), audio or video recordings of the song (e.g., original recordings of the work), Facebook or Myspace pages, iTunes, music players (e.g., MIDI-compatible players), alternate song arrangements, corresponding lead sheets, etc.

According to another embodiment of the invention, for songs in foreign languages, translated text of a song is provided as notation data, wherein the translated text is overlaid in the digital sheet music above, below, or adjacent to the original text. Alternatively, the digital sheet music is delivered to the user such that the translated text replaces the original text. In this case, a hyperlink may be provided to a file containing the original text. In some embodiments, a user may toggle between translations via user input, wherein the user may access supplemental translation or other notation data on an ad hoc, on-demand basis via a user device.

In an exemplary embodiment of the invention, notation data offered by the distribution server 210 is at least in part provided by users of the system, such as editors or transcribers employed by, or in contract with, the operator of the distribution server 210; independent professional or semi-professional individuals or other entities with no existing contractual relationship with the operator; or other users. In response to a request from the distribution server (e.g., an e-mail or post), or by the user's own initiative, the user creates and sends notation data to the distribution server 210 for use by the distribution server (e.g., to sell to other users as part of or separately from associated digital sheet music). For example, the user may provide the notation data as notation data embedded within a file of digital sheet music (e.g., as one or more PDF files with typed or handwritten text overlaid on sheet music, or as one or more files in MusicXML or other format), or in a form that is separate from the digital sheet music (e.g., as one or more text files, Microsoft Word files, PDF files, or files in another format).

In one embodiment of the invention, a user uploads notation data to the distribution server 210 in the form of a file that contains notation data, but lacks all or a material portion of the associated digital sheet music (e.g., the notes, tablature, chords, etc.). For instance, the notation data may be embedded in a document that may be graphically overlaid on a document containing the digital sheet music. Alternatively, notation data embedded in a file may be combined with an associated digital sheet music file based on mappings between data elements therein.

The distribution server 210 optionally compensates a user who provides notation data. Compensation may be financial or credit based, on a one-time basis, or based on a number of purchases of the notation data by other users, for example. In some embodiments, a maximum compensation amount is enforced by the payment module 260, wherein the user no longer is compensated for subsequent purchases of the notation data once the maximum amount has been paid to the user. In other embodiments, the user is only compensated if at least a certain minimum number of other users purchase or access the user's notation data. Where compensation is credit-based, the user may receive credits applicable to purchases of digital sheet music, print sheet music, or other products or services offered by the operator of the distribution server 210 or third parties.

Notation data uploaded to the distribution server 210 may be processed by a computer program (e.g., verified, modified, reformatted, converted, extracted, encrypted, decrypted, encoded, decoded, combined, etc.), and/or reviewed, modified, priced, cataloged (e.g., by an editor) prior to being made available to other users.

In an exemplary embodiment, fingering indications for a song are determined in a similar manner to that described in U.S. Pat. No. 7,518,057, or in Al Kasimi et al., "A Simple Algorithm for Automatic Generation of Polyphonic Piano Fingerings," Proceedings of the 8th International Conference on Music Information Retrieval, 2007, pp. 355-356.

In some embodiments of the invention, a user can store his or her digital sheet music, or an archive or backup thereof, in a remote location and access, update, and/or share such digital sheet music as needed. In some embodiments, the user can selectively store his or her notation data, modify the notation data in the course of using the sheet music, obtain additional notation data from other users or entities, and/or share the notation data with other users or entities. The embodiments of FIGS. 7-9 below can be optionally combined with other embodiments herein, such as the embodiments of FIGS. 1-6 above. For instance, a single entity can operate the distribution server 210 and library server 710 in some embodiments.

Figure 7:
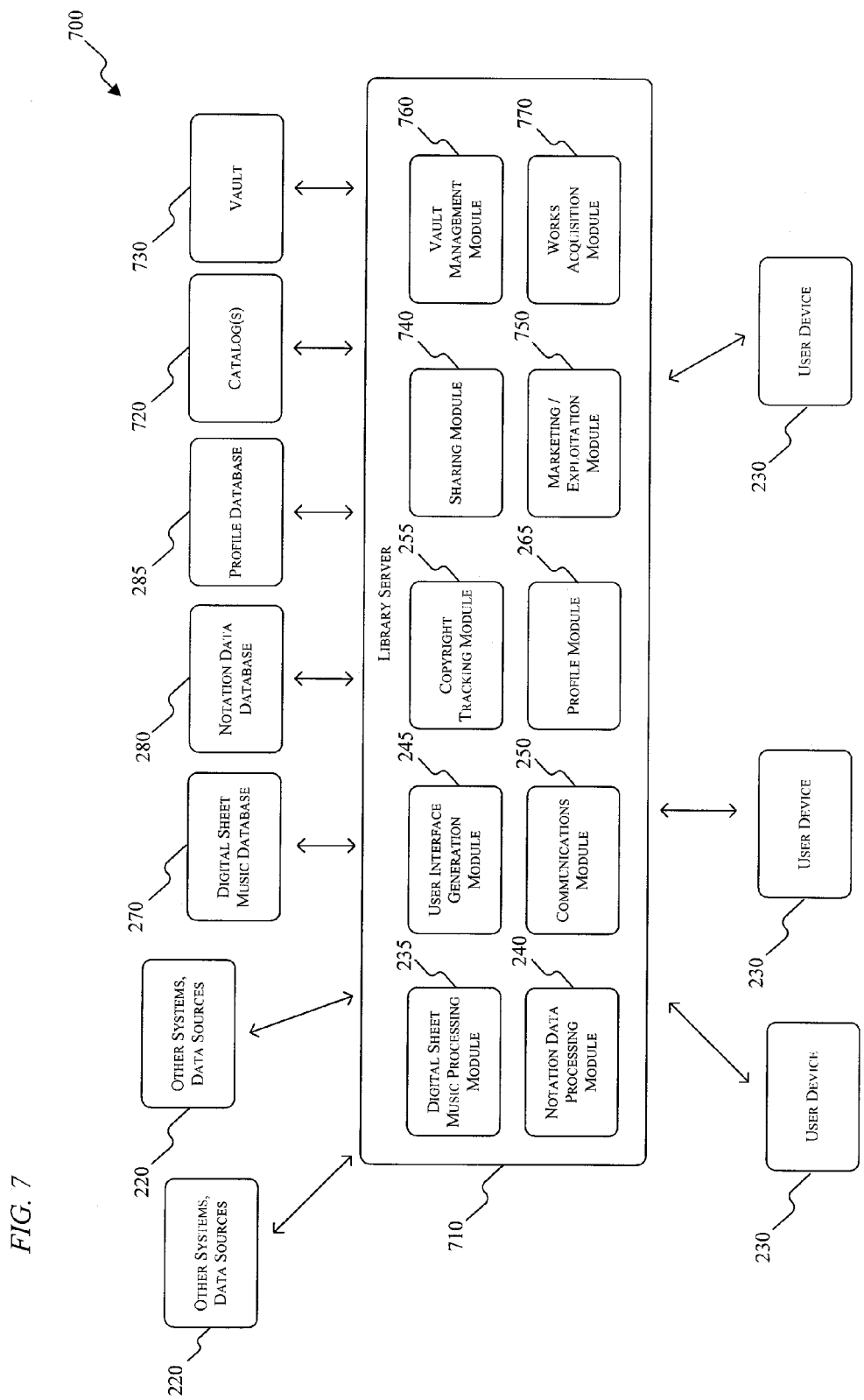
FIG. 7 illustrates a system for maintaining a digital sheet music library according to an embodiment of the invention.

FIG. 7 illustrates a system 700 for maintaining a digital sheet music library according to an embodiment of the invention. The system 700 is generally implemented with various client and server components, such as in an electronic commerce framework (e.g., a cloud computing framework, Software as a Service [SaaS], etc.). The system 700 includes a library server 710, a digital sheet music database 270, a notation data database 280, a profile database 285, a plurality of other systems and data sources 220 (e.g., remote databases and application servers accessible by, or in communication with, the library server 710), one or more catalogs 720, a vault 730, and a plurality of user devices 230 (e.g., user devices such as listed above in connection with FIG. 1). The library server 710, databases 270, 280, 285, catalog(s) 720, vault 730, systems and data sources 220, and user devices 230 communicate over any suitable communication means, such as wired and/or wireless network connections spanning networks such as those listed above.

In some embodiments, the library server 710 stores copyrighted digital sheet music, public domain digital sheet music, notation data, or a combination thereof for a plurality of users, and may be operated by a for-profit entity, such as a publisher, or a non-profit entity, such as a conservatory of music or other organization that maintains an archive of digital sheet music. In some embodiments, users pay for storage and cataloging of digital sheet music by the library server 710. In other embodiments, storage and cataloging services are substantially free, with advertising, contributed, and/or other monies (e.g., monies from a user's prior purchase of digital sheet music that is stored and/or cataloged by the library server 710) being used to support operation of the system 700. In some embodiments, the operator of the library server 710 owns the copyright or substantially the entire copyright in a work that is stored as digital sheet music, owns a portion of the copyright, or is licensed by the copyright owner to store and/or distribute the work as digital sheet music.

The library server 710 includes a digital sheet music processing module 235, a notation data processing module 240, a user interface generation module 245, a communications module 250, a copyright tracking module 255, a profile module 265, a sharing module 740, a marketing/exploitation module 750, a vault management module 760, and a works acquisition module 770. In some embodiments, various modules of the library server 710 are implemented as a single module, or certain modules are external to the library server 710. For instance, the digital sheet music processing module 235 and the notation data processing module 240 can be implemented as a single module. Though not shown in FIG. 7, in some embodiments, the library server 710 includes a payment module such as the payment module 260 described above in connection with FIG. 2A.

The digital sheet music processing module 235, the notation data processing module 240, the user interface generation module 245, the communications module 250, the profile module 265, the digital sheet music database 270, notation data database 280, the copyright tracking module 255, and the profile database 285 perform functions such as described above in connection with the distribution server 210.

The library server 710 maintains one or more catalog(s) 720 that identify and organize information stored by or otherwise accessible to the library server 710, including digital sheet music, notation data (which may be stored in formats such as described above), user information, bibliographic information, information regarding systems or data sources 220, and the like. The catalog(s) 720 may be implemented as separate databases or as a part of the databases 270, 280 or other modules and may include a master catalog for the library server 710 and respective catalogs for each user of the system 700. Using the catalog(s) 720, the user interface generation module 245 presents to a user a listing, inventory, catalog, or other summary or indication of the user's music library that is stored or otherwise maintained by the library server 710, which may include digital sheet music for a plurality of songs, a plurality of notation data sets, customized data sets, etc.

In some embodiments, digital sheet music for a song that is stored in the digital sheet music database 720 is accessible by multiple authorized users (e.g., users who purchased the digital sheet music or an audio music file for the song (e.g., from iTunes), or users who paid an applicable subscription fee for access to digital sheet music for multiple titles). User-specific notation data for the song (e.g., customized data sets) is stored separately or distinctly and is accessible by the associated user (and other users, if such data is shared). This approach may enable updating and correction of the digital sheet music for the benefit of all users, and may eliminate unnecessary duplicative storage of digital sheet music by the library server 710. Additionally or alternatively, a file of digital sheet music for a song may be stored for each authorized user (e.g., in a dedicated portion of nonvolatile memory for that user or in a nonvolatile memory of a user device). For instance, a user may upload scanned sheet music or other digital sheet music files (such as in the formats listed above) to the library server 710 for storage in the databases 270 and/or 280 after processing by the digital sheet music and/or notation data processing modules 235, 240. In an embodiment, the modules 235 and/or 240 or another analysis module analyzes uploaded sheet music (e.g., scanned sheet music) that contains a user's annotations (e.g., personal notation data), and extracts and stores the user's annotations (e.g., in the database 280) without the sheet music. The annotations may be stored along with information about the sheet music (e.g., bibliographic information, information to map the annotations onto digital sheet music later, etc.). The analysis of the uploaded sheet music may include text, note, or other symbolic analysis, decoding of barcodes (e.g., QR codes), the generation of positional information of the user's notations, etc. to determine what sheet music has been uploaded and to enable subsequent mapping of the notation data so that digital sheet music containing the user's notation data can be presented to the user or other user(s).

The sharing module 740 allows a user to selectively share digital sheet music and/or notation data with other users or entities, such as users of the system 700. In one embodiment, a user uploads notation data to the library server 710 and in turn to the notation data database 280, such as the user's personal fingerings or other notation data. Additionally or alternatively, the notation data can be provided by the operator of the library server 710, other systems or data sources 220, the distribution server 210, and/or other users (e.g., via user devices 230) and stored in the notation data database 280. Digital sheet music can be similarly obtained and stored in the digital sheet music database 270. In an embodiment, via a user interface (e.g., provided by the user generation module 245) that receives user inputs, the user can choose to share digital sheet music and/or notation data for a song (or multiple songs) with a user, multiple users, a group of users, or one or more external entities. For instance, a teacher, professor, composer, conductor, or other user can share notation data with students, peers, members of an ensemble (e.g., a symphony or band), or others. The shared notation data can be accessed via the library server 710 or other locations, and access can be optionally conditional upon payment of a fee, an access privilege, or another criterion, such as the user's membership in a group that is licensed or authorized to access the shared notation data. In some embodiments, a user initiates sharing of the digital sheet music and/or notation data by invoking the sharing module 740. Additionally or alternatively, users who wish to access digital sheet music and/or notation data of another user may request that the user share the desired material, such as through a request made via the sharing module 740. Digital sheet music and/or notation data may be shared via e-mail attachment, Facebook, Myspace, a link to a secure site (e.g., FTP, extranet, intranet), etc. A user's notation data may be appropriately cataloged so that the user can select particular notation data sets (e.g., customized data sets) for sharing. In some embodiments, a user can selectively share a portion of the user's notation data for a song, can selectively share a user's digital sheet music while excluding all or a portion of the user's notation data, can specify that downstream sharing is permissible (i.e., users with whom the user has shared can in turn share the user's notation data), etc.

The marketing/exploitation module 750 provides a platform or portal and associated coordination, management, and tracking functions for a user to derive revenue or other benefits from the user's notation data and/or digital sheet music (e.g., digital sheet music for works composed by the user). In some embodiments, the marketing/exploitation module 750 and sharing module 740 are implemented as a single module or have overlapping functionality. In an exemplary embodiment, the marketing/exploitation module 750 receives user inputs that specify how a user wishes to share or distribute the user's notation data for a song. For instance, the marketing/exploitation module 750 may utilize a user interface that is generated by the user interface generation module 245 of the distribution server 210 or library server 710 and is accessible by other users. The user may receive monies, credits, points, etc., based on purchase and/or access of the notation data and/or associated digital sheet music by the other users. In some instances, the user and the operator of the distribution server 210 or library server 710 each receive a portion of monies generated. The user may retain any applicable copyrights or other ownership rights in the notation data and license the operator to distribute the notation data, or may assign rights to the entity for a one-time fee. Alternatively, as a condition for receiving the storage services of the library server 710, the user may agree to assign or license distribution of the user's notation data. It is to be understood that various other commercial arrangements are possible and may be facilitated by the marketing/exploitation module 750 and other modules in the servers 210, 710. Accordingly, embodiments of the invention provide additional sources of revenue beyond the mere sale of digital sheet music in standard formats.

The vault 730 stores digital sheet music and/or notation data to protect such information from unlawful or unintended access or distribution. The vault management module 760 manages the vault 730 and digital sheet music and/or notation data stored therein actually or virtually (e.g., via status flags, encryption, or other controls). In some embodiments, no separate vault is implemented, but data stored in the databases 270, 280 is essentially locked or secured by access controls managed by the vault management module 760. In an embodiment, a user uploads digital sheet music and/or supplemental notation data to the library server 710, wherein such digital sheet music and/or notation data did not originate, or was not previously provided by, the library server 710 (or distribution server 210). The vault management module 760 stores the uploaded information in the vault 730 or otherwise locks the uploaded information such that the user cannot share or otherwise distribute the uploaded information to others unless one or more conditions are met. For instance, the vault management module 760 communicates with the copyright tracking module 755 and/or systems or data sources 220 to determine applicable copyrights in the uploaded information. The processing modules 235, 240 and/or other analysis modules may analyze, convert, parse, decrypt, decode, or otherwise process digital sheet music and/or notation data received by the systems 200, 700 to attempt to recognize bibliographic and/or other identifying information so that the copyright or other ownership status can be checked. Additionally or alternatively, an uploading user can input identifying information to assist in the analysis. If it is determined that the applicable sheet music or notation data is in the public domain or not copyright-eligible, the vault management module 760 may unlock or otherwise release the uploaded information to enable subsequent sharing or distribution thereof.

The works acquisition module 770 communicates with systems and data sources 220 to obtain additional digital sheet music and/or notation data for inclusion in the holdings of the library server 710 or distribution server 210. In some embodiments, the works acquisition module 770 has an established arrangement with an entity operating a system or data source 220, whereby the works acquisition module 770 receives (e.g., downloads or is sent) digital sheet music and/or notation data from a system or data source 220. Additionally or alternatively, the works acquisition module 770 includes a bot or software agent (e.g., web crawler) that collects content from remote locations. In some embodiments, digital sheet music and/or notation data obtained by the works acquisition module 770 is stored in the vault 730 and analyzed as described above and, if appropriate, is unlocked or released from the vault for sharing or other distribution.

Figure 9:
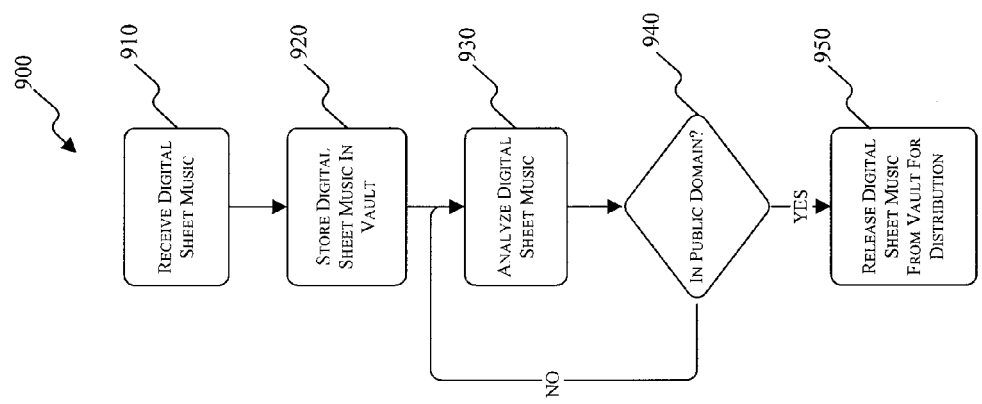
FIG. 9 is a flow diagram illustrating a process of storing and distributing digital sheet music according to an embodiment of the invention.
Figure 8:
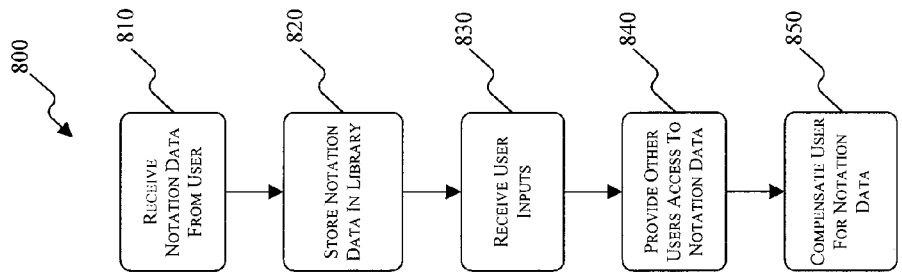
FIG. 8 is a flow diagram illustrating a process of storing and distributing notation data according to an embodiment of the invention.

FIGS. 8 and 9 are flow diagrams illustrating various processes according to embodiments of the invention. For instance, the illustrated processes may be implemented by the distribution server 210 or library server 710.

FIG. 8 is a flow diagram illustrating a process 800 of storing and distributing notation data according to an embodiment of the invention. Notation data, such as a user's personal notation data, is received from the user (step 810). The notation data may be embedded in the digital sheet music with which it is associated (e.g., in a scanned PDF or in another file format), or may be separate from the digital sheet music. The notation data is stored or cataloged in the user's music library (step 820). Inputs are received from the user that specify how and/or with whom the user wishes to share the notation data (step 830). Consistent with the user inputs and/or other processes of the music library, other users are provided access to the user's notation data (step 840). The user is optionally compensated for providing the notation data and/or based on other users' use and/or purchase of the notation data (step 850).

FIG. 9 is a flow diagram illustrating a process 900 of storing and distributing digital sheet music according to an embodiment of the invention. The process 900 also can be applied to notation data apart from its associated digital sheet music. Digital sheet music is received, such as from a user or from an external system or data source (step 910), and stored in a digital vault (step 920). The digital sheet music is analyzed to identify its content and determine whether it is subject to copyright (step 930). If the sheet music is not in the public domain or the providing user or entity is not authorized to license or control distribution (step 940), the process returns to step 930 to recheck (e.g., periodically) the copyright status or take another action, such as informing an uploading user that the digital sheet music cannot be lawfully shared or distributed with others. Conversely, if the sheet music is in the public domain (step 940), the sheet music is released from the vault for sharing or distribution (step 950).

In some embodiments, a default, standard, or base version of digital sheet music provided by a system such as the systems 200, 700 contains at least the minimum necessary notation data for a competent musician to play, read, or perform the music (e.g., the notes, chords, text, or other musical structures that are part of the composer or arranger's composition). In contrast, the associated supplemental notation data that is selectively available from the system is supplemental to such minimum necessary notation data, and is by itself not playable or readable as music (e.g., it lacks the notes, chords, and/or other essential musical elements of the song that in total are necessary for a competent musician to play, read, or perform the music as a whole) unless it is combined or assimilated with the minimum necessary notation data in the default, standard, or base version of digital sheet music. The supplemental notation data may typically comprise different notation data than was originally incorporated by the composer or arranger in the original score for the song, unless such original material is absent from a given version of digital sheet music (e.g., it was deleted by an editor or publisher), and the original material is available as supplemental notation data (e.g., for purchase).

In some embodiments, the distribution server 210 offers users default, standard, or base versions of respective editions or arrangements of the same song, each of which may be available in multiple keys. The distribution server 210 offers users supplemental notation data (e.g., respective data sets or customized data sets) for the respective editions or arrangements. For instance, a user can obtain one or more sets of supplemental notation data for a first edition or arrangement, and one or more sets of supplemental notation data for a second, different edition or arrangement.

In one embodiment, certain users of the systems 200, 700, such as educators, conductors, or students (e.g., students of educators utilizing the systems 200, 700) may receive discounts, access to digital sheet music and/or notation data, and/or other privileges not generally accorded to other users.

The systems 200, 700 optionally include a compilation module (not shown) that generates compilations, songbooks, treasuries, and/or other multi-song editions of digital sheet music and/or notation data. Such compilations may be generated based at least in part on user requests or other inputs, or may automatically be created by the systems 200, 700 (e.g., based on data indicative of the relative popularity of songs, data indicating that a class of users have purchased multiple titles for their libraries or are likely to do so, etc.). In one embodiment, a compilation module generates a header file that includes links to the respective songs of a compilation, and the user interface generation module 245 or other module presents a user a virtual table of contents with links to the digital sheet music and/or notation data in the compilation. As such, the systems 200, 700 may not need to store the underlying content in the compilation in multiple locations (i.e., both in the compilation and in a separate location for single-title access).

In another embodiment, a server such as the distribution server 210 or library server 710 provides users access to an array of digital sheet music that is in the public domain, which access may be free or paid for (e.g, the server provides a searchable, indexed national digital library of digital sheet music). As a means of generating additional revenue, the server offers users supplemental notation data and/or the ability to store supplemental notation data that is not otherwise a part of, or available in, public domain sheet music for a song. For example, the distribution server 210 or library server 710 offers detailed fingering indications and pedal markings (and/or other notation data) for an organ work by Johann Sebastian Bach, or note names and notations to aid in counting (e.g., numbers/counts) for a beginner's piece scored for piano, strings, brass, woodwinds, or percussion. The distribution server 210 or library server 710 appropriately indexes available stored notation data and/or generates or provides notation data on demand that is customized for a given user or class of users (e.g., users with biometric characteristics in certain ranges, users of a certain skill level, etc.).

In another embodiment, the user interface generation module 245 (and/or other modules, e.g., the marketing/exploitation module 750) receives inputs from, and provides outputs to, a user who desires to commercially exploit, share, or otherwise distribute the user's notation data, such as via the distribution server 210 or the library server 710. Such inputs and outputs allow the user to specify, assent to, and/or control how the user will be compensated for the user's notation data, who can receive the notation data (e.g., up to a maximum number of users, an unlimited number of users, specific users, users to be specifically identified by the user), etc. In some embodiments, the module 245 presents the user with a distribution agreement, assignment agreement, and/or license agreement. For example, the module 750 may generate such an agreement based on the user's inputs, and the user accepts the generated agreement, which binds the user and the operator of the server 210 or 710. The server 210 or 710 then offers and distributes the user's notation data in accordance with the terms of the agreement, ensuring that the user is compensated if so agreed upon. The user may access the marketing/exploitation module 750 for historical data that allows the user to audit distribution of the user's notation data. Alternatively, the module 750 or other module(s) may provide the user with periodic reports detailing transactional and/or summary data relating to distribution of the notation data and/or payment (e.g., royalty) information.

In some embodiments, the systems 200, 700 distribute notation data with access controls, such as described above, to limit viewing, copying, printing, and/or other dissemination of the notation data. It is to be appreciated that such controls can be useful to protect the interests of a user, owner, licensor, or other entity in their notation data, even if such notation data is determined not to be copyright-eligible in some respect(s). For example, an editor, musician, or other entity may expend significant energies in preparing supplemental notation data that is valuable to musicians, students, or others who are studying or playing the associated digital sheet music. Access controls may be employed to limit expropriation of the notation data and to prevent such notation data from being readily accessible in the public domain even if the associated sheet music is so accessible.

In an embodiment, the distribution server 210 or library server 710 include a mapping module (not shown) that receives an input notation data set (e.g., a standard data set or a data set customized for a first user) and generates an output notation data set that is modified relative to the input notation data set (e.g., a data set customized for a second user). The mapping module may utilize stored rules, algorithms, relationships, logic, or other input information (e.g., information stored in a user profile or provided to the mapping module, or metadata for notation data parameters) to generate the output notation data set. Accordingly, the servers 210, 710 need not generate a customized notation data set from scratch, but instead may make selective modifications to an input data set in order to generate a desired output data set. Notation data parameters such as described in connection with FIG. 2B above may be employed to facilitate the mapping process, wherein the mapping module selectively alters notation data associated with customizable notation data parameters.

Credentials (e.g., keys) needed by a user to obtain, read, view, print, distribute, or take other actions with respect to digital sheet music and/or notation data may be stored remotely (e.g., in a database of the systems 200, 700) or locally on a user's device.

The systems 200, 700 may rent or lend digital sheet music and/or notation data to users for a limited period of time and conditional upon a user's agreement not to unlawfully copy or share rented material. For instance, the systems 200, 700 may include a renting module (not shown) that provides a user a key with an expiration date or other limitation that allows the user to access rented material during the period in which the key is valid.

The systems 200, 700 may be in communication with printing houses or other publishing entities to print, assemble, bind, market, and/or distribute hard copies (i.e., paper copies, print music) of digital sheet music and/or notation data of the systems 200, 700. Additionally or alternatively, an entity operating the servers 210, 710 may have publishing capabilities of its own.

In another embodiment of the invention, the distribution server 210 (or library server 710) enables artists (e.g., recording artists, bands, other musicians) or composers to upload digital sheet music or other materials for distribution (e.g., on their own initiative). The distribution server 210 maintains a database of licensed artists or composers and creates respective credentials for use by the artists or composers or their agents in communicating with the system 200 (e.g., usernames/passwords, keys, IP addresses, and the like). The distribution server 210 receives a submission from an artist and makes the submission available for purchase and/or access by users. An entity (e.g., editor and/or module) of the distribution server 210 may optionally edit the submission (e.g., convert it to a standard format) and store the submission (e.g., in a digital vault) for later publication or distribution (e.g., at a higher price). Such embodiments enable artists or composers to distribute materials (e.g., rough or informal music scores, music for less popular works, lead sheets, notes from composing or recording sessions, autographed sheet music, etc.) that are of interest to users without the need to expend significant publisher resources or to condition distribution on a threshold level of anticipated demand in the marketplace. For example, an artist or composer can upload handwritten or other rough sheet music for distribution, and the distribution server 210 can earn revenue before the music is edited and polished for more formal distribution, assuming the operating entity decides to do so. In an embodiment, the artist or composer can direct royalties or other payments associated with distribution of the materials to charitable organizations. In another embodiment, an artist or composer's submission is made available for a limited duration and/or for a maximum number of users (e.g., at a relatively low price or a premium price), and/or is made available as a bonus feature or offering to users who have purchased digital sheet music for other songs of the artist or composer.

The various aspects, features, embodiments, or implementations of the invention described above can be used alone or in various combinations. One or more of the above modules and/or associated functions or steps may be located or performed in the United States or in another country. For instance, module(s) of the distribution server 210 or library server 710 may be located outside the United States, wherein a user in the United States interacts with such module(s), such as via a user device 230. Additionally, backup or redundant servers for module(s) located outside the United States, or other archival means (e.g., data storage devices such as flash drives), may be located in the United States.

Embodiments of the invention can be implemented by software, hardware, or a combination of hardware and software. The invention can also be embodied as computer-readable code on a computer-readable medium (e.g., a nontransitory computer-readable medium). The computer-readable medium is any data storage device that can store data which can thereafter be read by a computer system (e.g., by a microprocessor or similar device executing instructions encoded in a computer-readable medium). Examples of a computer-readable medium include read-only memory (RAM), random-access memory (RAM), optical drives, flash drives, DVDs, CD-ROMs, magnetic tape, and carrier waves. The computer-readable medium can also be distributed over network-coupled computer systems so that the computer-readable code is stored and executed in a distributed fashion.

The many features and advantages of the invention are apparent from the written description and, thus, it is intended by the appended claims to cover all such features and advantages of the invention. Further, since numerous modifications and changes will readily occur to those skilled in the art, the claims should not be limited to any specific hardware or software implementation or combination of software or hardware. Accordingly, all suitable modifications and equivalents may be resorted to as falling within the scope of the invention.

What is claimed is:

1. A computer-implemented method of distributing digital sheet music to a plurality of users via a network, wherein a server operated by a distributing party receives digital sheet music orders from the plurality of users, comprising:
    offering to a first user and a second user, by the server operated by the distributing party, first digital sheet music data representative of a song arrangement for a predetermined instrument, the first digital sheet music data encoded in a predetermined format and comprising a first data portion including at least one set of predetermined notation data, wherein the predetermined notation data includes substantially all the musical notes of the song arrangement, and wherein the first digital sheet music data is offered at a first price via an ordering interface presented to the first user and the second user;
    receiving, by the server from the first user over the network via the ordering interface, a first request for second digital sheet music data representative of the song arrangement for the predetermined instrument, wherein the second digital sheet music data is offered by the server at a second price that is greater than the first price;
    processing, by the server, the first request for second digital sheet music data;
    generating, by the server, the second digital sheet music data, the second digital sheet music data encoded in the predetermined format and comprising the first data portion and a second data portion including at least one set of first supplemental notation data, wherein the first supplemental notation data differs from the predetermined notation data;
    providing, by the server, the second digital sheet music data to the first user, based on the processed first request;
    receiving, by the server from the second user over the network via the ordering interface, a second request for third digital sheet music data representative of the song arrangement for the predetermined instrument, wherein the third digital sheet music data is offered by the server at a third price that is greater than the first price;
    processing, by the server, the second request for third digital sheet music data;
    generating, by the server, the third digital sheet music data, the third digital sheet music data encoded in the predetermined format and comprising the first data portion and a third data portion including at least one set of second supplemental notation data, wherein the second supplemental notation data differs from the predetermined notation data and the first supplemental notation data; and
    providing, by the server, the third digital sheet music data to the second user, based on the processed second request,
    wherein the first supplemental notation data is customized for the first user and the second supplemental notation data is customized for the second user.

2. The computer-implemented method of claim 1, wherein the first supplemental notation data includes fingering indications.

3. The computer-implemented method of claim 1, wherein the predetermined notation data includes text in a first language and the first supplemental notation data includes translated text in a second language, the translated text comprising a translation into the second language of the text in the first language.

4. The computer-implemented method of claim 1, wherein the second supplemental notation data includes a hyperlink to a location that provides song-related information.

5. The computer-implemented method of claim 1, further comprising storing, by the server, a first profile associated with the first user, wherein the first supplemental notation data is customized for the first user based at least in part on the first profile.

6. The computer-implemented method of claim 5, further comprising storing, by the server, a second profile associated with the second user, wherein the second supplemental notation data is customized for the second user based at least in part on the second profile.

7. The computer-implemented method of claim 1, wherein the first digital sheet music data is offered in at least two different keys.

8. The computer-implemented method of claim 1, wherein the first supplemental notation data is embedded in the provided second digital sheet music data.

9. The computer-implemented method of claim 1, further comprising:
    storing, by the server, transaction information regarding the provided second digital sheet music data, wherein the transaction information indicates that the first user has purchased the second digital sheet music data;
    updating a portion of the second digital sheet music data after providing the second digital sheet music data to the first user, wherein the updated portion of the second digital sheet music data includes at least one modification to the provided second digital sheet music data; and
    providing at least the updated portion of the second digital sheet music data to the first user without charging the first user.

10. The computer-implemented method of claim 1, further comprising generating the first supplemental notation data, wherein the first supplemental notation data is generated after the first request for second digital sheet music data is received from the first user.

11. The computer-implemented method of claim 1, wherein the first digital sheet music data comprises public domain sheet music.

12. The computer-implemented method of claim 11, wherein the first digital sheet music data is offered by the server at no charge.

13. The computer-implemented method of claim 1, wherein the second digital sheet music data comprises a file, the second data portion being stored in a header portion of the file.

14. The computer-implemented method of claim 1, wherein the second digital sheet music data further comprises the third data portion, wherein the second supplemental notation data is not accessible to the first user.

15. A computer-implemented system of distributing digital sheet music to a plurality of users via a network, wherein a distribution server receives digital sheet music orders from the plurality of users, comprising:
 a distribution server including an ordering interface,
 the ordering interface configured to offer, to a first user and a second user, first digital sheet music data representative of a song arrangement for a predetermined instrument, the first digital sheet music data encoded in a predetermined format and comprising a first data portion including at least one set of predetermined notation data, wherein the predetermined notation data includes substantially all the musical notes of the song arrangement,
 wherein the ordering interface is further configured to receive, from the first user over the network, a first request for second digital sheet music data representative of the song arrangement for the predetermined instrument,
 wherein the ordering interface is further configured to receive, from the second user over the network, a second request for third digital sheet music data representative of the song arrangement for the predetermined instrument;
 a processing module configured to process the first request for second digital sheet music data and the second request for third digital sheet music data,
 the processing module further configured to generate the second digital sheet music data, the second digital sheet music data encoded in the predetermined format and comprising the first data portion and a second data portion including at least one set of first supplemental notation data, wherein the first supplemental notation data differs from the predetermined notation data, and
 the processing module further configured to generate the third digital sheet music data, the third digital sheet music data encoded in the predetermined format and comprising the first data portion and a third data portion including at least one set of second supplemental notation data, wherein the second supplemental notation data differs from the predetermined notation data and the first supplemental notation data; and
 a payment module configured to charge a first price for the first digital sheet music data, a second price for the second digital sheet music data, and a third price for the third digital sheet music data, wherein each of the second price and the third price is greater than the first price,
 wherein the distribution server is configured to provide the second digital sheet music data to the first user, and the third digital sheet music data to the second user,
 wherein the first supplemental notation data is customized for the first user and the second supplemental notation data is customized for the second user.

16. The computer-implemented system of claim 15, wherein the distribution server further comprises a profile module that is configured to store a first profile associated with the first user and a second profile associated with the second user, wherein the first supplemental notation data is customized for the first user based at least in part on the first profile and the second supplemental notation data is customized for the second user based at least in part on the second profile.

17. The computer-implemented system of claim 15, further comprising a copyright tracking module configured to maintain copyright status information associated with the song arrangement.

18. The computer-implemented system of claim 15, wherein the second digital sheet music data further comprises a notation parameter list indicative of at least one notation parameter within the second digital sheet music data that is customizable.

19. The computer-implemented system of claim 15, wherein the processing module is configured to retrieve at least a portion of the second digital sheet music data from a database.

20. A computer-implemented method of distributing digital sheet music to a plurality of users via a network, wherein a server operated by a distributing party receives digital sheet music orders from the plurality of users, comprising:
 offering to a first user and a second user, by the server operated by the distributing party, first digital sheet music data representative of a song arrangement for a predetermined instrument, the first digital sheet music data encoded in a predetermined format and comprising a first data portion including at least one set of predetermined notation data, wherein the predetermined notation data includes musical elements of the song arrangement, and wherein the first digital sheet music data is offered via an ordering interface presented to the first user and the second user;
 receiving, by the server from the first user over the network via the ordering interface, a first request for second digital sheet music data representative of the song arrangement for the predetermined instrument;
 processing, by the server, the first request for second digital sheet music data;
 generating, by the server, the second digital sheet music data, the second digital sheet music data encoded in the predetermined format and comprising the first data portion and a second data portion including at least one set of first supplemental notation data, wherein the first supplemental notation data differs from the predetermined notation data;
 providing, by the server, the second digital sheet music data to the first user, based on the processed first request;
 receiving, by the server from the second user over the network via the ordering interface, a second request for third digital sheet music data representative of the song arrangement for the predetermined instrument;
 processing, by the server, the second request for third digital sheet music data;
 generating, by the server, the third digital sheet music data, the third digital sheet music data encoded in the predetermined format and comprising the first data portion and a third data portion including at least one set of second supplemental notation data, wherein the second supplemental notation data differs from the predetermined notation data and the first supplemental notation data; and
 providing, by the server, the third digital sheet music data to the second user, based on the processed second request,
 wherein the first supplemental notation data is customized for the first user and the second supplemental notation data is customized for the second user.

21. The computer-implemented method of claim 20, wherein the first supplemental notation data is customized for the first user based at least in part on an input received from the first user.

22. The computer-implemented method of claim 20, wherein the first supplemental notation data includes fingering indications.

* * * * *